(12) United States Patent
Kangas et al.

(10) Patent No.: US 7,986,919 B2
(45) Date of Patent: Jul. 26, 2011

(54) SIMPLIFIED IMPAIRMENTS MATRIX CALCULATION FOR SINR ESTIMATION

(75) Inventors: Ari Kangas, Lidingö (SE); Markus Ringström, Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 569 days.

(21) Appl. No.: 12/174,825

(22) Filed: Jul. 17, 2008

(65) Prior Publication Data

US 2009/0239474 A1 Sep. 24, 2009

Related U.S. Application Data

(60) Provisional application No. 61/037,918, filed on Mar. 19, 2008.

(51) Int. Cl.
*H04B 1/00* (2006.01)
(52) U.S. Cl. .......... 455/63.1; 455/67.13; 455/135; 455/226.3; 375/254; 375/278
(58) Field of Classification Search .......... 455/63.1, 455/67.13, 135, 226.3, 277.2, 278.1, 296, 455/222; 375/254, 278, 284, 285, 346
See application file for complete search history.

(56) References Cited

U.S. PATENT DOCUMENTS

| | | | | |
|---|---|---|---|---|
| 5,012,193 A * | 4/1991 | Chen | | 324/366 |
| 5,500,856 A * | 3/1996 | Nagase et al. | | 370/441 |
| 6,301,293 B1 * | 10/2001 | Huang et al. | | 375/130 |
| 6,405,036 B1 * | 6/2002 | Almgren et al. | | 455/425 |
| 6,496,749 B1 * | 12/2002 | Yamaguchi et al. | | 700/121 |
| 6,496,941 B1 * | 12/2002 | Segal et al. | | 714/4.2 |
| 6,510,321 B2 * | 1/2003 | Ritzen et al. | | 455/450 |
| 6,671,338 B1 * | 12/2003 | Gamal et al. | | 375/346 |
| 6,775,260 B1 * | 8/2004 | Dabak et al. | | 370/342 |
| 6,856,643 B1 * | 2/2005 | Yang et al. | | 375/130 |
| 6,892,073 B2 * | 5/2005 | Fattouch | | 455/446 |
| 6,975,666 B2 * | 12/2005 | Affes et al. | | 375/130 |
| 7,027,533 B2 * | 4/2006 | Abe et al. | | 375/341 |
| 7,054,635 B1 * | 5/2006 | Ritzen et al. | | 455/444 |
| 7,200,183 B2 * | 4/2007 | Olson et al. | | 375/285 |
| 7,558,223 B2 * | 7/2009 | Shirakata et al. | | 370/280 |
| 7,565,114 B2 * | 7/2009 | Ito et al. | | 455/69 |
| 7,671,800 B2 * | 3/2010 | Lee | | 342/420 |
| 7,773,949 B2 * | 8/2010 | Je et al. | | 455/63.1 |
| 7,808,937 B2 * | 10/2010 | McCloud et al. | | 370/286 |

(Continued)

FOREIGN PATENT DOCUMENTS

WO 2006/138135 A2 12/2006

OTHER PUBLICATIONS

Gao et al., "Maximizing the Minimum SINR of V-Blast System by Power Control," Signal Processing, Oct. 12, 2007, pp. 1046-1052, vol. 88, No. 4, Elsevier Science Publishers B.V., Amsterdam, Netherlands.

(Continued)

*Primary Examiner* — Minh D Dao
(74) *Attorney, Agent, or Firm* — Coats & Bennett PLLC

(57) ABSTRACT

A recursive method of calculating an inverse impairments matrix is used to generate an SINR estimate, which in turn is used to generate a CQI estimate. The recursive inverse impairments matrix calculation avoids the need to perform a computationally intensive matrix inversion, allowing for faster CQI estimate generation and consuming less power.

14 Claims, 4 Drawing Sheets

U.S. PATENT DOCUMENTS

| | | | | |
|---|---|---|---|---|
| 7,881,412 | B2* | 2/2011 | Banister | 375/346 |
| 2007/0298718 | A1* | 12/2007 | Je et al. | 455/63.1 |
| 2008/0240304 | A1* | 10/2008 | Oh et al. | 375/341 |
| 2011/0069742 | A1* | 3/2011 | Narayan et al. | 375/148 |

OTHER PUBLICATIONS

Gesbert et al., "Shifting the MIMO Paradigm," IEEE Signal Processing Magazine, Sep. 2007, pp. 36-46, vol. 24, No. 5, IEEE Service Center, Piscataway, NJ.

Madhow, "Fundamentals of Digital Communication," Mar. 2008, pp. 225, Cambridge, England.

Schubert et al., "Iterative Multiuser Uplink and Downlink Beamforming under SINR Constraints," IEEE Transactions on Signal Processing, Jul. 2005, pp. 2324-2334, vol. 53, No. 7, IEEE Service Center, New York, NY.

Schubert et al., "User Ordering and Power Allocation for Optimal Multiantenna Precoding/Decoding," 2004 ITG Workshop on Smart Antennas—Munich, Germany, Mar. 18-19, 2004, pp. 174-181, IEEE, Piscataway, NJ.

Swanson, "Signal Processing for Intelligent Sensor Systems," Jan. 2000, pp. 238-239, Marcel Dekker, US.

Volakis, "Antenna Engineering Handbook," Jan. 2007, p. 25-12, The McGraw-Hill Companies, New York, NY.

\* cited by examiner

SIMPLIFIED IMPAIRMENTS MATRIX CALCULATION FOR SINR ESTIMATION

This application claims priority to U.S. Provisional Patent Application Ser. No. 61/037,918, filed Mar. 19, 2008, and incorporated herein by reference in its entirety.

FIELD OF THE INVENTION

The present invention relates generally to wireless communication networks, and in particular to a reduced complexity method of calculating a signal to interference and noise ratio (SINR) that avoids matrix inversion calculations.

BACKGROUND

Wireless communication systems are required to transmit ever-increasing amounts of data, in support of expanded subscriber services, such as messaging, e-mail, music and video streaming, and the like. Transmitting a higher volume of data over a given channel requires transmission at a higher data rate.

One known technique to improve data transmission rates in wireless communications is the use of multiple input, multiple output (MIMO) technology, wherein signals are transmitted from multiple transmit antennas and may be received by multiple receiver antennas. Using advanced coding and modulation schemes, two or more streams of data may be transmitted simultaneously to a receiver, increasing the data rate.

Maintaining high data rates in MIMO systems requires fast link adaptation. That is, the transmitter must constantly alter its selection of transmission parameters, such as the modulation and coding scheme selected, or antenna configuration, based on the current characteristics of the channel, which can change rapidly. In a Frequency Division Duplex (FDD) system, the instantaneous downlink channel conditions are not available at the base station, and must be determined by a receiver and communicated to the base station. In Wideband CDMA (WCDMA) and Long Term Extension (LTE), the instantaneous downlink channel conditions are communicated to the base station through a Channel Quality Indicator (CQI).

Estimating the CQI is a delicate task, which involves a calculation of a signal to interference and noise ratio (SINR). For a multi-stream transmission, estimating the SINR is a more complex task than estimating the SINR for a single-stream transmission, due to the inter-stream interference. Traditional SINR estimation techniques involve summing the noise and respective inter-stream interferences (a matrix quantity) to obtain an impairments matrix, and then inverting the matrix to calculate an inverse impairments matrix. The impairments matrix is of size $n_{rx} \times n_{rx}$, where $n_{rx}$ is the number of receive antennas. Matrix inversion is a computationally intensive mathematical operation. The limited computing resources (and power budget) of a mobile receiver restrict the frequency with which the CQI can be calculated and communicated to a base station, thus reducing the link adaptation rate, which places an upper bound on the available data rate.

SUMMARY

According to one or more embodiments disclosed herein, a recursive method of calculating an inverse impairments matrix is used to generate an SINR estimate, which in turn is used to generate a CQI estimate. The recursive inverse impairments matrix calculation avoids the need to perform a matrix inversion, allowing for faster CQI estimate generation and consuming less power.

One embodiment relates to a method of estimating a SINR in a wireless communication network transmitting data in a plurality of streams from one or more transmit antennas to one or more receive antennas, without performing a matrix inversion calculation in a receiver to obtain an inverse impairment matrix. Channel conditions from each transmit antenna to each receive antenna are estimated and a matrix of estimated channel noise covariance is generated. An initial inverse impairment matrix for a given pilot position is calculated based on the channel conditions and the channel noise covariance. An inverse impairment matrix is recursively calculating for the pilot position by recursively summing the noise and inter-stream interference, beginning with the initial inverse impairment matrix. An SINR is then calculated based on the recursively calculated inverse impairment matrix.

DETAILED DESCRIPTION

Figure 1:
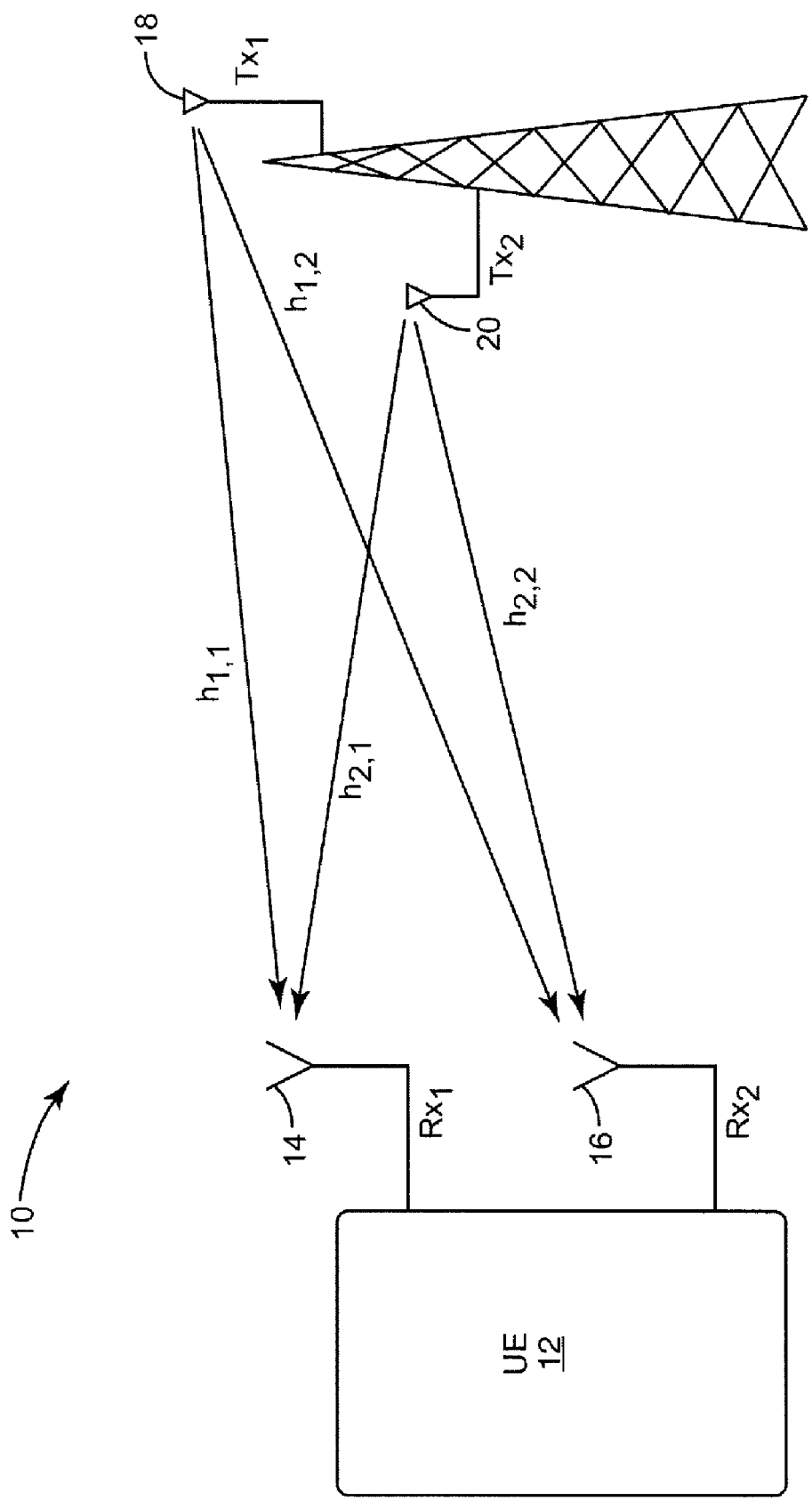
FIG. 1 is a diagram of downlink channels in a MIMO wireless communications network.

FIG. 1 depicts the downlink signal paths in a MIMO wireless communication network 10. A User Equipment (UE) 12, such as a mobile transceiver, receives signals on one or more receive antennas 14, 16. The signals are transmitted from one or more transmit antennas 18, 20. Each signal path experiences different channel conditions, which include impairment effects such as fading, interference, noise, and the like. In general, each channel is unique, as indicated. As known in the art, the transmitters 18, 20 transmit known reference symbols, also referred to as pilot symbols, at known positions within a data frame, to facilitate measurement of the channel conditions by the UE 12. Channel and noise estimates are thus available at the pilot positions.

Figure 2:
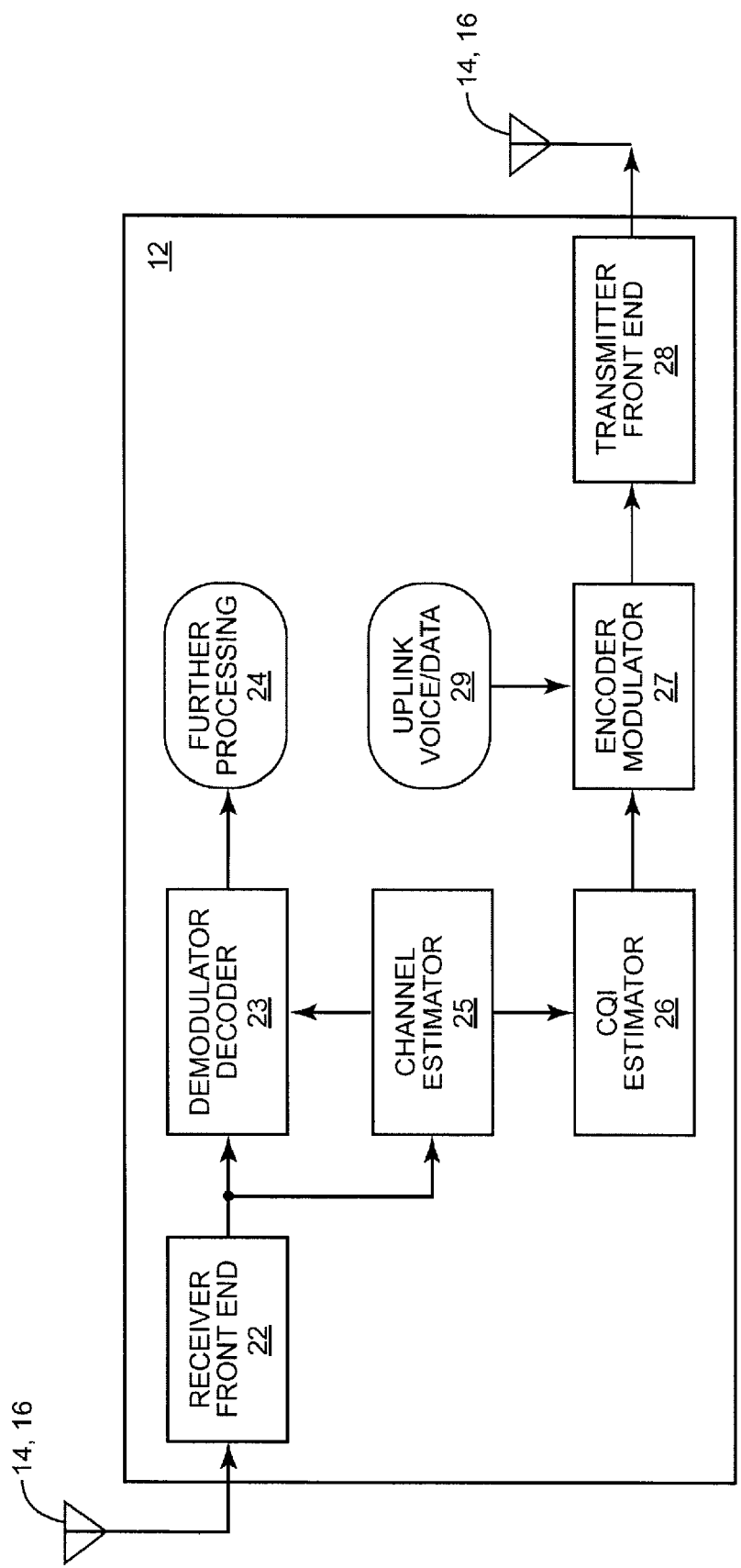
FIG. 2 is a functional block diagram of relevant portions of a wireless communication User Equipment (UE).

FIG. 2 depicts the CQI estimation and feedback path in the UE 12. Downlink signals are received at one or more receive antennas 14, 16, and are processed by receiver front-end circuits 22. Data symbols are demodulated and decoded at block 23, and are further processed, such as rendered into speech or audio, displayed as text or video, processed as commands, or the like, in various circuits in the UE 12, represented collectively by block 24. Pilot signals are provided by the receiver front-end circuits 22 to a channel estimation function 25. The channel estimator 25 generates channel noise and interference estimates, and provides these to the demodulator and decoder function 23, so that it can detect the received data symbols. The channel estimator 25 additionally provides a SINR to the CQI estimator function 26, which estimates a CQI for transmission to the base station for link adaptation. The CQI is provided to an encoder and modulator function 27, which also receives upstream data from various circuits in the UE 12, represented collectively by block 29. Encoded and modulated data are processed by a transmitter front-end 28 and other circuits, and modulated signals are transmitted to the base station on one or more antennas 14, 16.

Figure 3:
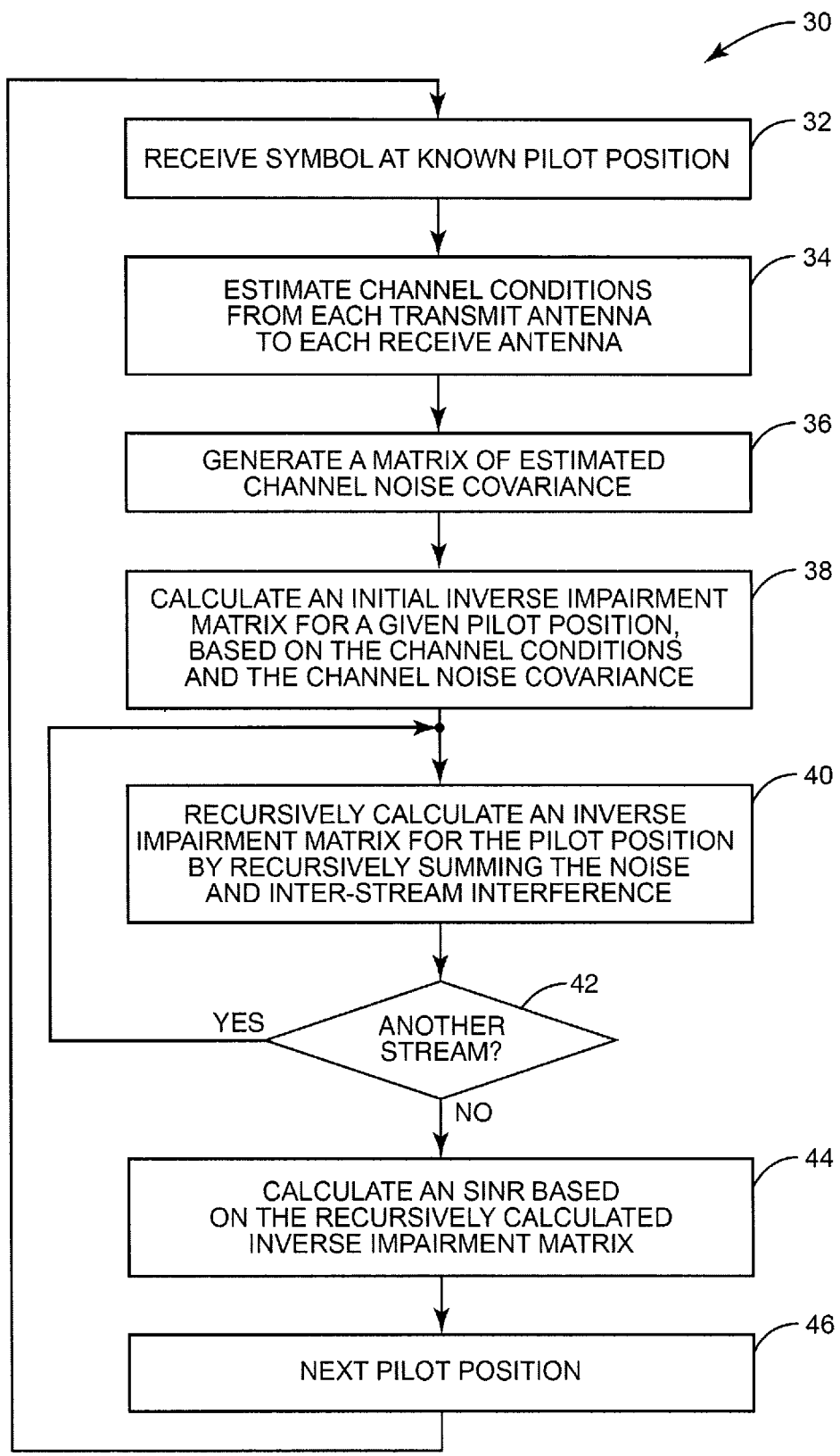
FIG. 3 is a flow diagram of a first method of estimating SINR in a MIMO wireless communication network.

FIG. 3 depicts a method 30 of generating a SINR in the channel estimator 25. In the text below, a 4×4 MIMO system is assumed, but the method is easily generalized to a MIMO system of any dimension, as is understood by a person skilled in the art. Pilot symbols are received from the receiver front-in circuits 22 (block 32). Channel conditions from each transmit antenna 18, 20 to each receive antenna 14, 16 are estimated for each pilot p. In particular, corresponding to a pilot p, estimates of channel vectors h(0)(p), ..., h(3)(p) are generated, each of dimension 4×1. The jth element of h(i)(p) is the complex channel response from the ith transmit antenna 18, 20 to the jth receive antenna 14, 16 for pilot p.

A noise covariance matrix R, of dimension 4×4, is also generated (block 36). R is generally diagonal with entries $\sigma^2$ (j), j=0, ..., 3. The entries $\sigma^2$ (j), j=0, ..., 3 may for example represent, but are not limited to, thermal noise, other system interference, inter-cell interference and intra-cell interference resulting from transmission to other users.

Note that R is not necessarily diagonal. In the case that R is not diagonal, several options exist that still reduce the computational complexity of calculating an inverse impairments matrix. First, a matrix inversion of R may be performed, using the structure of R and some applicable matrix algebra, resulting in a computationally simpler matrix inversion method than the general case, and building the remaining of the inverse impairments matrix without matrix inversions. As another option, R may be rounded to a diagonal matrix, since in most practical cases, it will be almost diagonal. Still another option is to let $\sigma^2$ in R be an arbitrary low number, implicitly assuming that the inter-stream interference is dominating other interference.

VAC(k) is a vector containing the Virtual Antenna Combination of antennas used for transmission using Virtual Antenna Identifier VAI=k. In the case of four transmit antennas, VAC is a subset of the integers {0, 1, 2, 3}. The complete sets of combinations are listed in Table 1 below. Fifteen different sets exist, hence VAI=0, ..., 14.

TABLE 1

Virtual Antenna Combinations for CQI Reporting

| Virtual Antenna Identifier Value (VAI) | Virtual Antenna Combinations (VAC) |
|---|---|
| 0 | {0} |
| 1 | {1} |
| 2 | {2} |
| 3 | {3} |
| 4 | {0, 1} |
| 5 | {0, 2} |
| 6 | {0, 3} |
| 7 | {1, 2} |
| 8 | {1, 3} |
| 9 | {2, 3} |
| 10 | {0, 1, 2} |
| 11 | {0, 1, 3} |
| 12 | {0, 2, 3} |
| 13 | {1, 2, 3} |
| 14 | {0, 1, 2, 3} |

As an example, h(VAC(9)(2))(p) is the vector channel (i.e., the channel response at all RX antennas) at pilot position p from transmit antenna VAC(9)(2)={2,3}(2)=3, i.e., the second element of the VAC corresponding to VAI=9.

$n_s(k)$ is the number of streams used for VAI=k, as shown in Table 2 below.

TABLE 2

Number of Streams for Different VAIs

| Variable name | Value |
|---|---|
| $n_s(0), \ldots, n_s(3)$ | 1 |
| $n_s(4), \ldots, n_s(9)$ | 2 |
| $n_s(10), \ldots, n_s(13)$ | 3 |
| $n_s(14)$ | 4 |

$P_{D/P}(k)$ denotes the offset between data and pilot power for VAI=k, such that $P_{data}=P_{D/P}(k)P_{pilot}$ SINR for stream s for VAI=k, pilot p, can be written as $$SINR(k)(s)(p)=P_{D/P}(k)h^*(VAC(k)(s))(p)Q(k)(s)(p)h(VAC(k)(s))(p)$$

with the inverse impairments matrix $$Q(k)(s)(p)=(\Sigma_{j\neq s}P_{D/P}(k)h(VAC(k)(j)(p)h^*(VAC(k)(j))(p)+R)^{-1}$$

where the operator x* denotes the complex conjugate transpose of x. The matrix inversion operation is computationally complex.

According to one or more embodiments of the present invention, the impairments matrix may be written recursively as $$(Q(k)(s)(p)^{(i)})^{-1}=(Q(k)(s)(p)^{(i-1)})^{-1}+P_{D/P}(k)h_ih_i^*, i=0,\ldots,n_s(k)-1$$

using the simplified notation $h_i=h(VAC(k)((s+i) \bmod n_s(k)))(p)$ where mod is the modulo operator.

An initial inverse impairment matrix for a given pilot position is calculated (block 38) as $Q(k)(s)(p)^{(0)}=R^{-1}$. Since R is diagonal, it is easily inverted using only scalar inversions.

Using the matrix inversion lemma, one can write:

$$Q(k)(s)(p)^{(i)} = Q(k)(s)(p)^{(i-1)} - \frac{Q(k)(s)(p)^{(i-1)}h_ih_i^*Q(k)(s)(p)^{(i-1)}}{\frac{1}{P_{D/P}(k)} + h_i^*Q(k)(s)(p)^{(i-1)}h_i}$$

for i=0, ..., $n_s(k)$−1, with $Q(k)(s)(p)^{(0)}$ being a diagonal matrix with entries $1/\sigma^2(j)$, j=0, ..., 3.

This inverse impairments matrix is recursively calculated (block 40), over all streams (block 42). The SINR(k)(s)(p) is then determined (block 44) as $$SINR(k)(s)(p)=P_{D/P}(k)h_0^*Q(k)(s)(p)^{(n_s(k)-1)}h_0.$$

Figure 4:
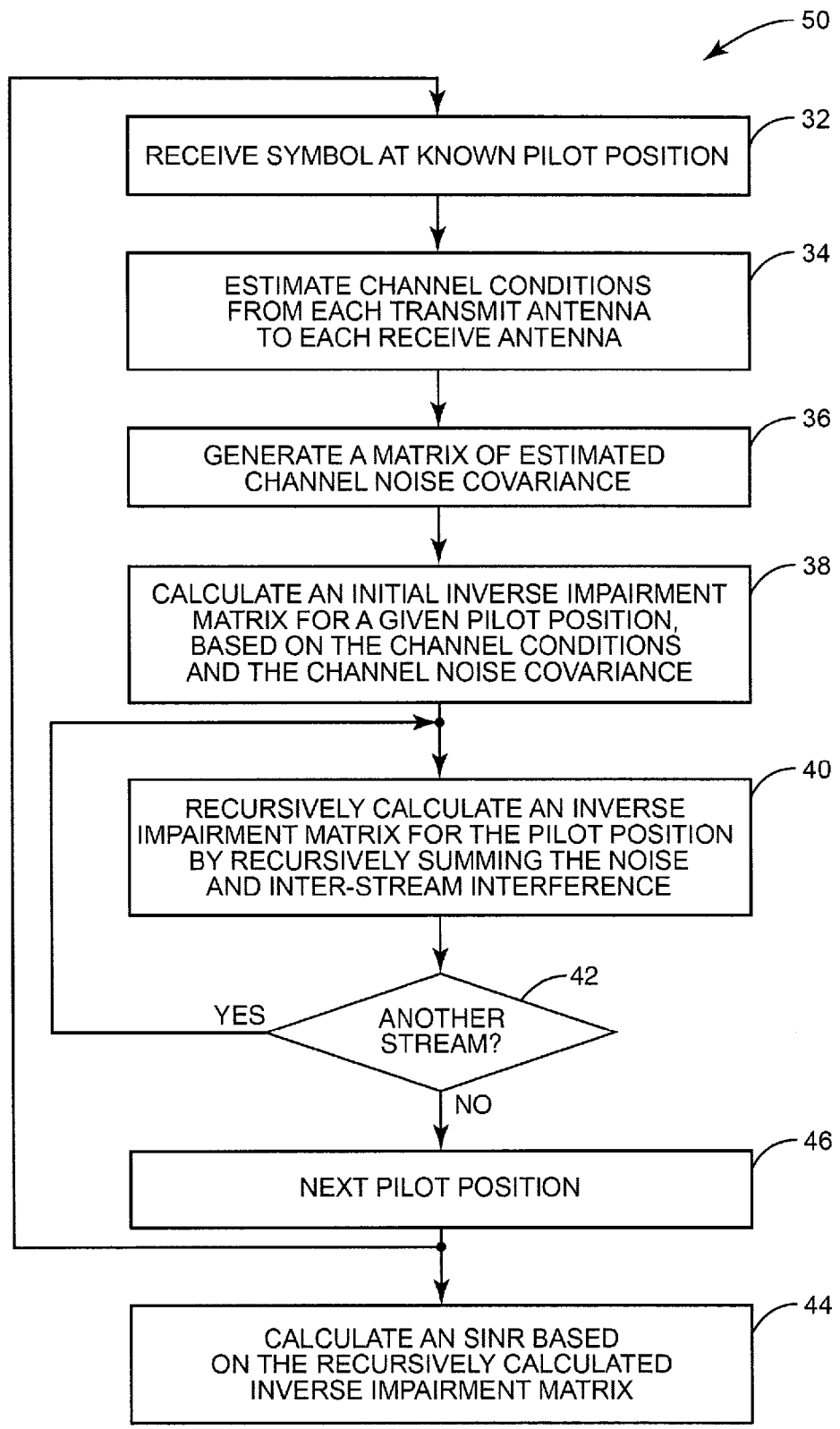
FIG. 4 is a flow diagram of a second method of estimating SINR in a MIMO wireless communication network.

The method is then repeated for the next pilot position (block 46). Alternatively, as depicted in FIG. 4, in an alternative method 50, all desired pilot positions may be considered (block 46) and the inverse impairment matrix recursively calculated (blocks 38-42), prior to calculating the SINR.

The entire method 30 or 50 can be performed using only matrix times vector multiplications and inner/outer vector products. No matrix inversion calculation is required. Accordingly, the method may be utilized by UE 12 to calculate SINR estimates more rapidly, with fewer computational resources, and consuming less power, then by known techniques (i.e., those involving matrix inversions). As a result, CQI estimates may be generated more rapidly, allowing faster link adaptation and higher data rates.

Although the inventive processing has been disclosed herein in the context of downlink channel estimation by a UE, those of skill in the art will readily recognize that the same processing may be employed by a receiver in a base station, to perform uplink channel estimation.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. A method of estimating a signal to interference and noise ratio (SINR) in a wireless communication network transmitting data in a plurality of streams from one or more transmit antennas to one or more receive antennas, without performing a matrix inversion calculation in a receiver to obtain an impairment matrix, comprising:
   estimating channel conditions from each transmit antenna to each receive antenna;
   generating a matrix of estimated channel noise covariance;
   calculating an initial inverse impairment matrix for a given pilot position, based on the channel conditions and the channel noise covariance;
   recursively calculating an inverse impairment matrix for the pilot position by recursively summing the noise and inter-stream interference, beginning with the initial inverse impairment matrix; and
   calculating an SINR based on the recursively calculated inverse impairment matrix.

2. The method of claim 1 further comprising repeating the method steps for a subsequent pilot position.

3. The method of claim 1 wherein the inverse impairment matrix is recursively calculated over two or more pilot positions prior to calculating the SINR.

4. The method of claim 1 wherein the initial impairment matrix is a diagonal matrix.

5. The method of claim 1 wherein recursively calculating an inverse impairment matrix comprises calculating the inverse impairment matrix without performing a matrix inversion calculation.

6. The method of claim 1 wherein recursively calculating an inverse impairment matrix comprises calculating only matrix times vector multiplications and inner/outer vector products.

7. The method of claim 1 wherein recursively calculating an inverse impairment matrix comprises calculating the inverse impairment matrix for a particular Virtual Antenna Identifier, stream, and pilot position.

8. The method of claim 1 wherein recursively calculating an inverse impairment matrix comprises calculating $$Q(k)(s)(p)^{(i)} = Q(k)(s)(p)^{(i-1)} - \frac{Q(k)(s)(p)^{(i-1)} h_i h_i^* Q(k)(s)(p)^{(i-1)}}{\frac{1}{P_{D/P}(k)} + h_i^* Q(k)(s)(p)^{(i-1)} h_i}$$

for $i = 0, \ldots, n_s(k) - 1$, where the initial inverse impairment matrix is $Q(s)(p)^{(0)} = R^{-1}$ where R is the estimated channel noise covariance, being a diagonal matrix with entries $\sigma^2(j)$, $j=0, \ldots,$ (number of receive antennas)−1;

$h_i = h(VAC(k)((s+i) \bmod n_s(k))(p)$;

h is a vector of channel conditions wherein the jth element of h(i)(p) is the estimated complex channel response from the ith transmit antenna to the jth receive antenna for pilot p;

VAC(k) is a vector containing the Virtual Antenna Combination of antennas used for transmission using Virtual Antenna Identifier VAI=k, k=0, \ldots, 14;

$n_s(k)$ is the number of data streams for VAI=k;

$P_{D/P}(k)$ is the offset between data and pilot power for VAI=k;

s denotes a stream;

p denotes a pilot position; and mod is the modulo operator.

9. The method of claim 8 wherein calculating an SINR based on the recursively calculated inverse impairment matrix comprises calculating $$SINR(k)(s)(p) = P_{D/P}(k) h_0^* Q(k)(s)(p)^{(n_s(k)-1)} h_0.$$

10. The method of claim 1 wherein the method steps are performed in a User Equipment (UE), and the SINR is calculated for the downlink channel.

11. The method of claim 1 wherein the method steps are performed in a base station, and the SINR is calculated for the uplink channel.

12. A transceiver operative in a wireless communication network that transmits data in a plurality of streams from one or more transmit antennas, the receiver operative to transmit a Channel Quality Indicator (CQI), comprising:
   at least one receive antenna;
   a receiver front end receiving data in at least one stream from the transmit antennas;
   a channel estimator operative to estimate the channel response from each transmit antenna to each receive antenna and to generate a matrix of estimated channel noise covariance; and
   a CQI estimator receiving the channel response estimates and the estimated channel noise covariance, and operative to generate a signal to interference and noise ratio (SINR) based on a recursively calculated inverse impairment matrix generated by recursively summing the noise and inter-stream interference for a given pilot position over a plurality of data streams, without performing a matrix inversion calculation.

13. The transceiver of claim 12 wherein the CQI estimator is further operative to map the SINR to a CQI.

14. The transceiver of claim 12 further comprising a transmitter operative to transmit the CQI on a reverse link.

* * * * *

UNITED STATES PATENT AND TRADEMARK OFFICE
CERTIFICATE OF CORRECTION

PATENT NO. : 7,986,919 B2  Page 1 of 1
APPLICATION NO. : 12/174825
DATED : July 26, 2011
INVENTOR(S) : Kangas et al.

It is certified that error appears in the above-identified patent and that said Letters Patent is hereby corrected as shown below:

In Column 4, Line 17, delete "(k)(j)(p)h" and insert -- (k)(j))(p)h --, therefor.

In Column 6, Line 1, in Claim 8, delete "Q)" and insert -- Q(k) --, therefor.

In Column 6, Line 7, in Claim 8, delete "(k))" and insert -- (k))) --, therefor.

Signed and Sealed this
Third Day of January, 2012

David J. Kappos
*Director of the United States Patent and Trademark Office*